(12) United States Patent
Foster et al.

(10) Patent No.: US 7,575,260 B2
(45) Date of Patent: Aug. 18, 2009

(54) LIFTING DEVICE

(76) Inventors: Lionel Foster, 14 Silver Birch Avenue, Wyke, Bradford (GB) BD 12 9EP; Linda Mary Foster, 14 Silver Birch Avenue, Wyke, Bradford (GB) BD12 9EP (*) Notice: Subject to any disclaimer, the term of this patent is extended or adjusted under 35 U.S.C. 154(b) by 0 days.

(21) Appl. No.: 10/577,852

(22) PCT Filed: Oct. 29, 2004

(86) PCT No.: PCT/GB2004/004601

§ 371 (c)(1),
(2), (4) Date: Dec. 26, 2006

(87) PCT Pub. No.: WO2005/044712

PCT Pub. Date: May 19, 2005

(65) Prior Publication Data

US 2007/0170734 A1    Jul. 26, 2007

(30) Foreign Application Priority Data

Oct. 29, 2003  (GB) ................................ 0325191.5

(51) Int. Cl.
*B65G 7/12* (2006.01)
(52) U.S. Cl. .................... 294/16; 294/113; 294/902
(58) Field of Classification Search .................. 294/16, 294/28, 31.2, 106, 113, 114, 110.1, 902
See application file for complete search history.

(56) References Cited

U.S. PATENT DOCUMENTS

| 964,432 | A | * | 7/1910 | Kemmler | .................. 294/113 |
|---|---|---|---|---|---|
| 2,218,845 | A | * | 10/1940 | Kiggins | ........................ 294/16 |
| 2,367,889 | A | | 1/1945 | Radtke | |
| 2,645,376 | A | * | 7/1953 | Gunther | ................... 220/23.89 |
| 2,749,173 | A | * | 6/1956 | Peterson | ..................... 294/113 |
| 3,960,398 | A | * | 6/1976 | Johnson | ....................... 294/16 |
| 4,000,922 | A | * | 1/1977 | Wade | .......................... 294/16 |
| 4,527,823 | A | * | 7/1985 | Straus | .......................... 294/16 |
| 4,723,800 | A | * | 2/1988 | Sanders | ........................ 294/16 |
| 4,753,474 | A | * | 6/1988 | Radford | ...................... 294/160 |
| 5,009,558 | A | * | 4/1991 | Savedra, Jr. | .................. 414/23 |
| 5,601,324 | A | * | 2/1997 | Purcell | ...................... 294/31.2 |
| 6,416,096 | B1 | * | 7/2002 | Stefanik et al. | ............... 294/16 |
| 6,840,556 | B1 | * | 1/2005 | Catlett | ......................... 294/16 |

FOREIGN PATENT DOCUMENTS

| DE | 93 15 085 U1 | 2/1994 |
|---|---|---|
| DE | 201 08 620 U1 | 2/2002 |
| DE | 103 14 457 A1 | 6/2004 |
| FR | 2 769 302 | 9/1999 |
| WO | WO 97/08083 | 3/1997 |

* cited by examiner

*Primary Examiner*—Dean J Kramer
(74) *Attorney, Agent, or Firm*—Venable LLP; Michael A. Sartori; Justine A. Gozzi

(57) ABSTRACT

A lifting device (102) including a handle (16) and at least two pivotably connected frame members (104) adapted to pivot between a first, open, configuration (02) and a second, closed, configuration (03), wherein at least a portion of inner walls of the at least two frame members (104) form a gripping surface, which gripping surface is adapted to lie substantially parallel with side walls of an article to be lifted (01) when in the second, closed, configuration (03).

19 Claims, 4 Drawing Sheets

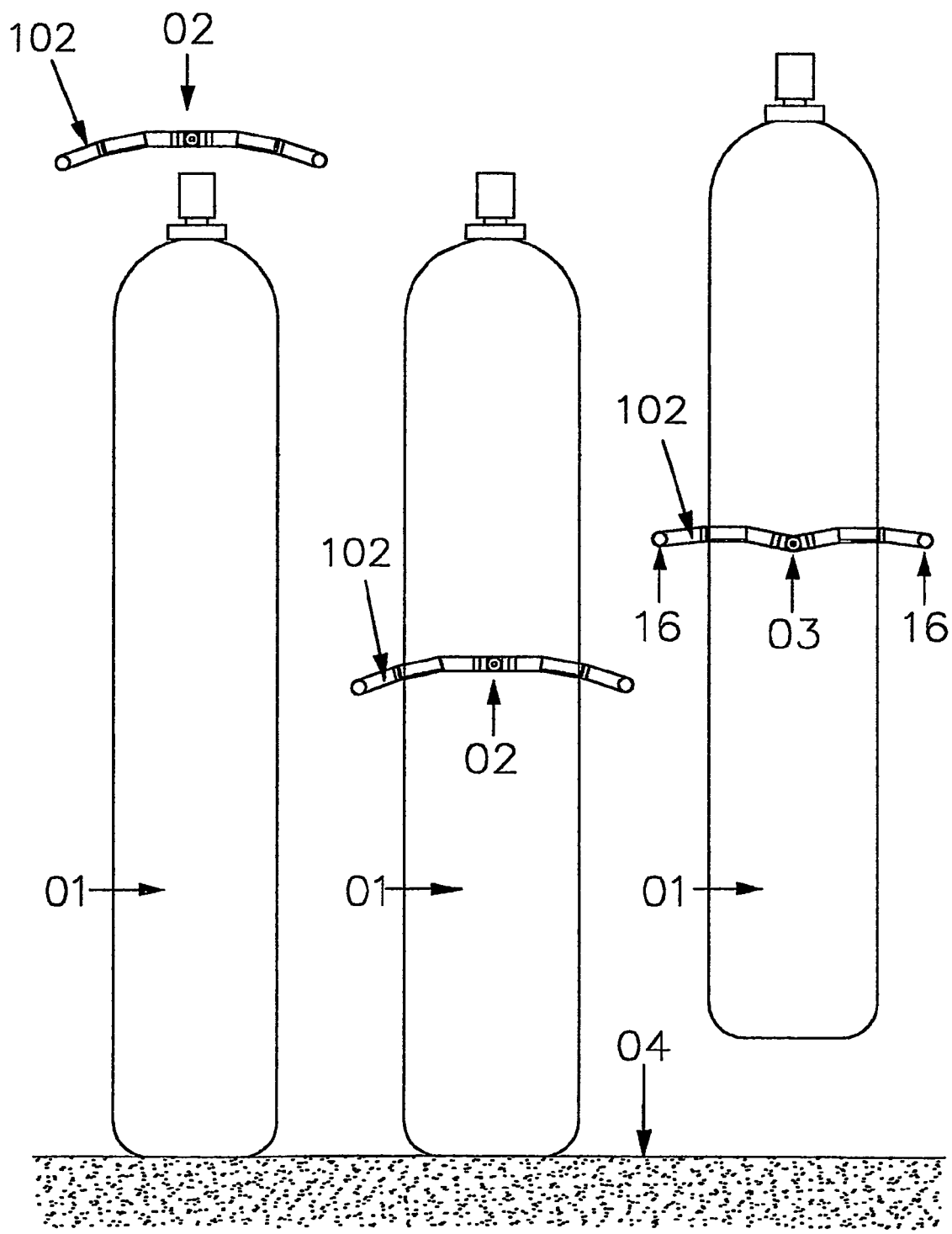

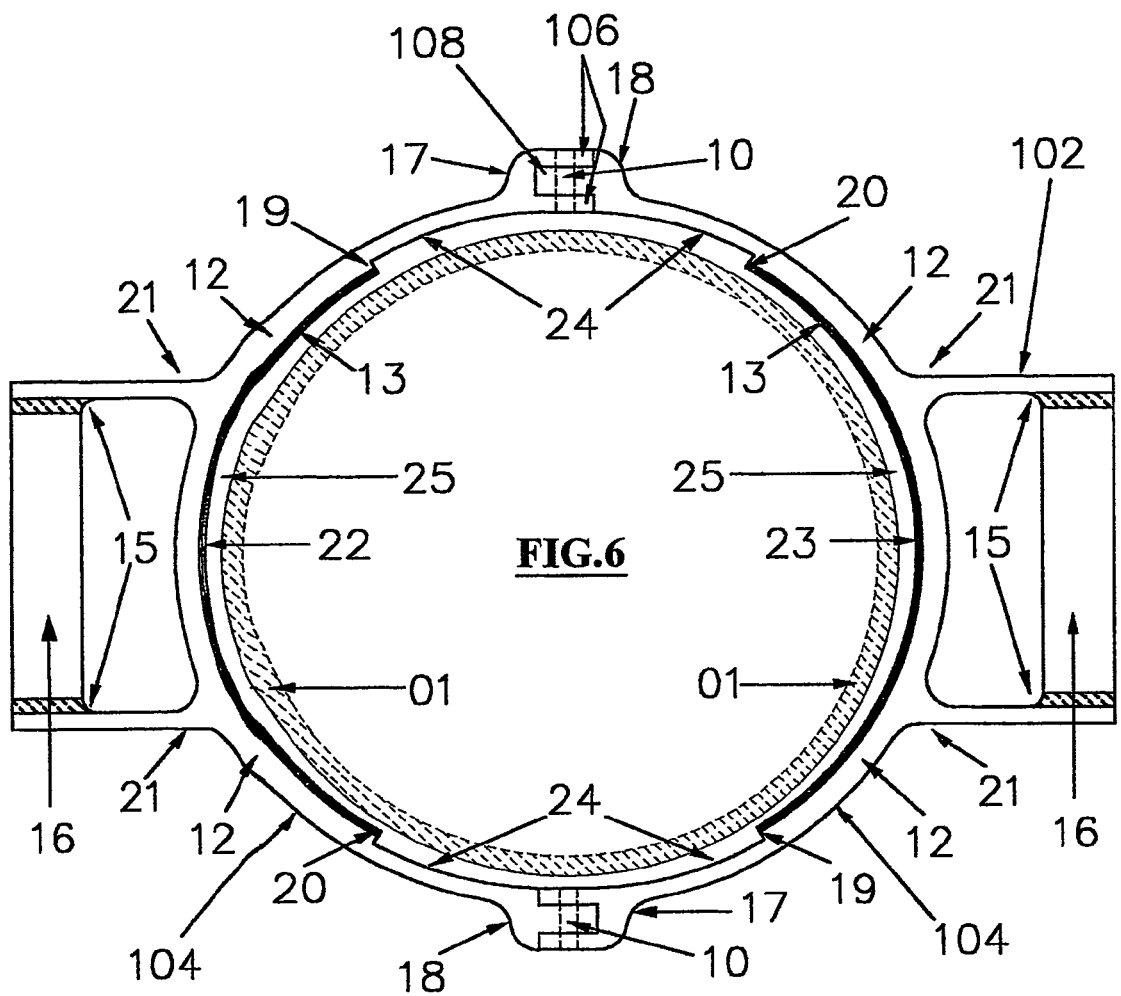
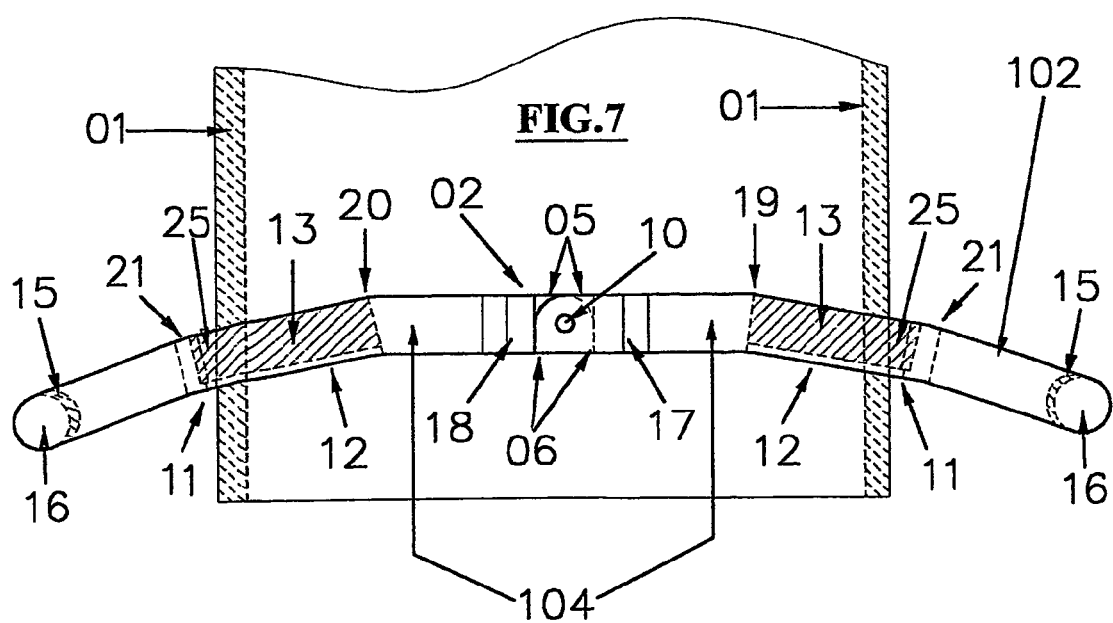

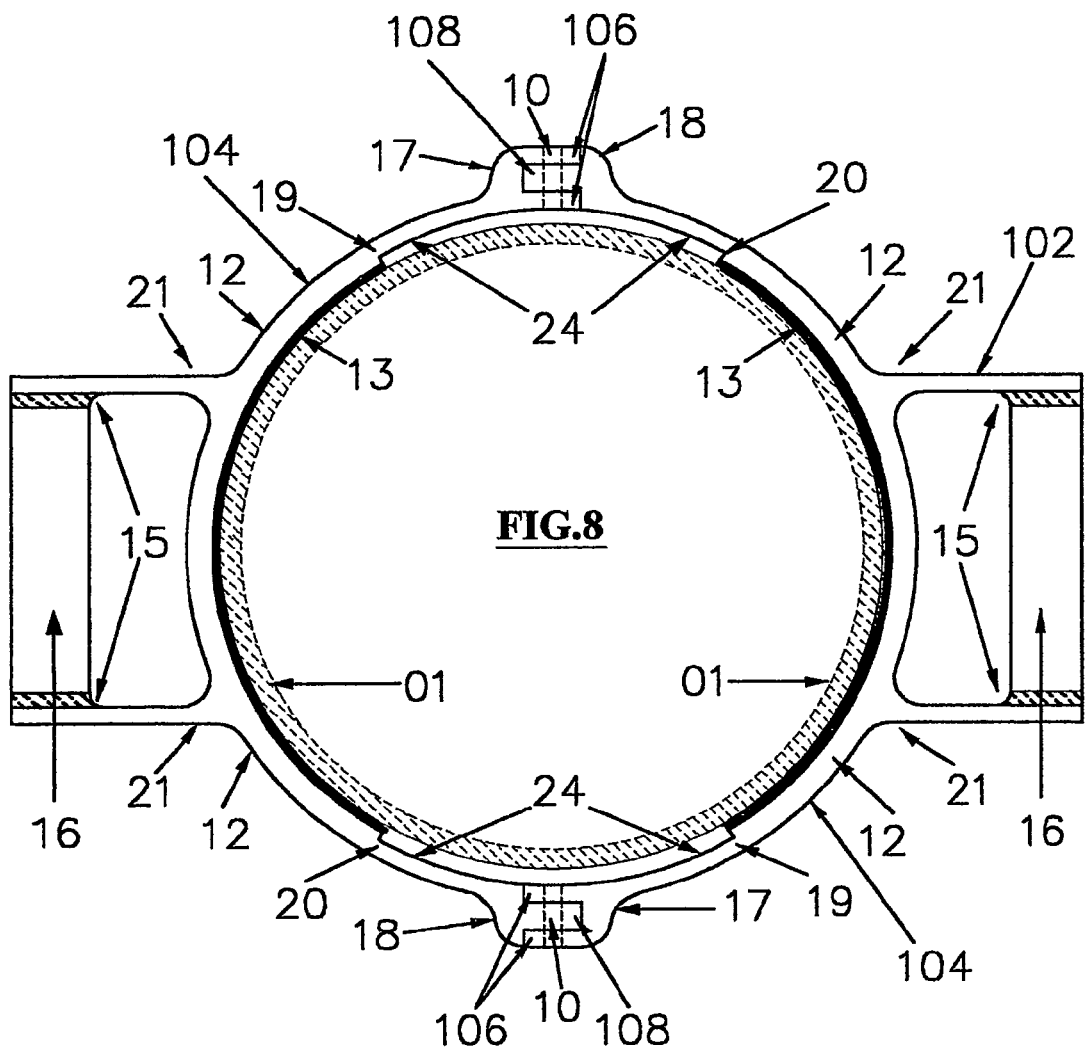
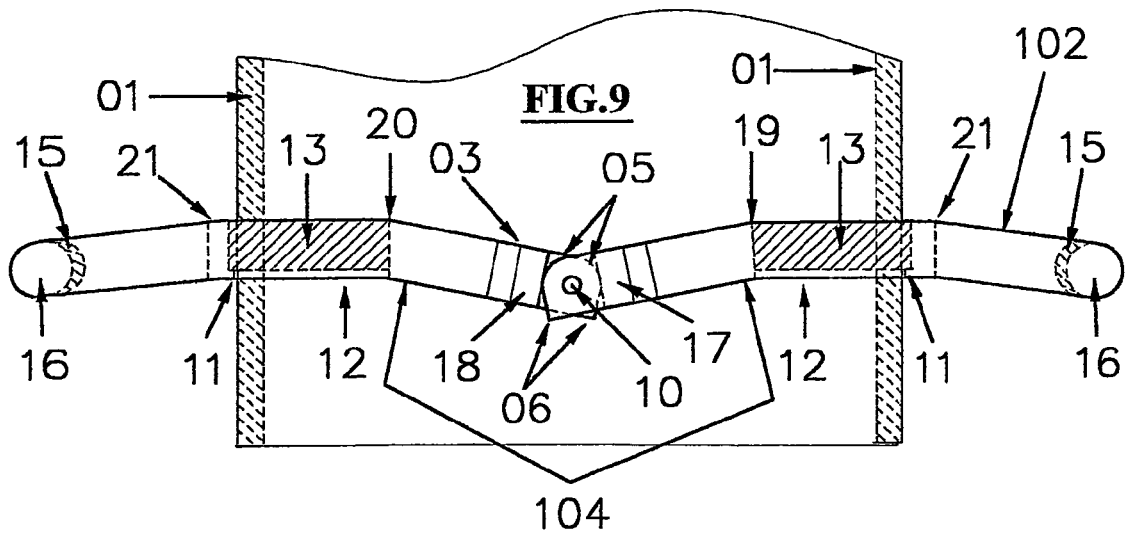

LIFTING DEVICE

The present invention relates to a lifting device, particularly, although not exclusively, to a lifting device for lifting articles having a circular cross section.

Items having a circular cross section are often difficult to lift, particularly when an article is heavy and has no handles attached thereto. An example of such an article is a storage cylinder for the storage of compressed gas (such as oxygen, acetylene, argon etc.)

Therefore, in one embodiment, the present invention relates to a vertical lifting device for compressed gas storage cylinders.

Compressed gas storage cylinders are used in a wide range of industrial areas. They are used, predominantly, in the metal associated industries. Gas cylinders are transported, stored and used in the vertical position, standing on their base with the valve at the top. The gas cylinders have to be moved and lifted onto trolleys and machines. The way to move the gas cylinders is to roll them or lift them either manually, using a 'Bear hug' lifting technique, or mechanically with the use of slings. The gas cylinders are very heavy and difficult to lift manually.

It is an object of embodiments of the present invention to address the above mentioned disadvantaged and provide a device which can be used to facilitate the lifting of existing articles quickly and easily.

According to a first aspect of the present invention there is provided a lifting device comprising handle means and at least two pivotably connected frame members adapted to pivot between a first, open, configuration and a second, closed, configuration, wherein at least a portion of inner walls of the at least two frame members form a gripping surface, which gripping surface is adapted to lie substantially parallel with side walls of an article to be lifted when in the second, closed, configuration.

Advantageously, by adapting the gripping surface to lie substantially parallel with the side wall of an article to be lifted, the amount of grip on the side wall of an article to be lifted is very high thus making the article less likely to slip while being lifted.

Preferably, the lifting device comprises two frame members which are pivotably connected, preferably at two points. Preferably, the two pivot points are substantially coaxial.

Preferably, the frame members are shaped such that they define a substantially oval shaped aperture when in the first, open, configuration. Preferably, the frame members are shaped such that they define a substantially circular shaped aperture when in the second, closed, configuration.

Preferably, the handle means comprise at least one handle which is preferably attached to one of the at least two frame members. Preferably, the handle means comprises two handles, which two handles are preferably attached to the at least two frame members. In a particularly preferred embodiment, the handle means comprises two handles each of which is attached to one of the two frame members and situated substantially opposite each other about the device.

Preferably, the gripping surface defines a portion of an oval when in the first, open, configuration. Preferably, the gripping surface defines a portion of a circle when in a second, closed configuration.

Preferably, the gripping surface is formed integrally with the inner wall of the frame members. Preferably, the gripping surface comprises gripping means, which are preferably made of a resilient material. Preferably, the gripping means are attached to the gripping surface. Preferably, the gripping means comprises a friction increasing material. The friction increasing material may be chosen by reference to the article to be lifted. For example, if it is intended to use the device to lift compressed gas storage cylinders, then a suitable friction enhancing material may be rubber or the like.

Preferably, the gripping surface comprises retaining means adapted to retain the gripping means thereon. Preferably, the retaining means comprise a lip which preferably extends along a lower edge of the gripping surface. Preferably, the underside of the gripping means abuts the lip.

Preferably, the frame members each comprise a first portion, proximal to the pivots, which first portions preferably, when in the first, open, configuration, extend away from the pivots at substantially 180° to each other, preferably being aligned with each other. Preferably, when in the first, open, configuration the first portions of the frame members are substantially coplanar. Preferably, in the second, closed, configuration the first portions of the frame members extend away from the pivots at an angle to each other. By the term "at an angle to each other" it is meant that the first portions of the frame members are not substantially coplanar, preferably forming an angle of between 175° and 140°, more preferably forming an angle between 170° and 150° and most preferably forming an angle of about 165°.

Preferably, a second portion of each frame member extends away from an end of the first portion of each frame member distal to the pivots. Preferably, when in the second, closed, configuration, the second portions of the frame members are preferably aligned and preferably substantially coplanar. Preferably, the second portion incorporates the gripping surface. Preferably, the second portion extends away from the first portion at a downwardly sloping angle thereto, preferably at an angle of between 185° and 200°, more preferably, at an angle of about 187°.

Preferably, the handle means extend away from the second portion of the frame members, preferably, at a downwardly sloping angle thereto, preferably at an angle of between 185° and 200°, more preferably, at an angle of about 187°.

In use, the device is placed over an article to be lifted while in the first open configuration. When at a suitable height for a user to lift the article, the device is then pivoted by lifting up the handles thereby moving the device into the second, closed, configuration According to a second aspect of the present invention there is provided a lifting device comprising handle means and at least two frame members being connected by at least one pivot and adapted to pivot between a first, open, configuration and a second, closed, configuration, the frame members each comprising a first portion, proximal to the at least one pivot, and a second portion extending away from an end of the first portion distal to the at least one pivot, which first portions, when in the first, open, configuration are substantially coplanar and which second portions, when in the second, closed, configuration are substantially coplanar.

A lifting device according to the present invention provides a fast and easy means of lifting gas cylinders vertically, for one person, two people, or if required with the aid of mechanical means, by providing two secure handles at the sides of the gas cylinder.

According to a third aspect of the present invention there is provided a compressed gas storage cylinder vertical lifting device comprising two substantially half round or oval frames having each a rubber type insert, the said frames having an underside and a top, the said frames being hinged to produce, in use, grip on a cylinder when the frames are moved towards each other in upwards direction, said device comprising a lifting member fixed to each of the said frames allowing the cylinder to be lifted, the said rubber type insert being secured to the frames and resting on a shoulder provided on the underside of each said frames.

Preferably, in use, when the hinged frames are positioned with respect to each other so as to define a maximum aperture therebetween, there is formed, between each of said rubber type inserts and the said cylinder, a clearance having substantially a moon-crescent shape.

Preferably, each of the said frames have a supporting shoulder with a first thickness and the rubber type insert has a second thickness, and the first thickness is substantially half that of the second thickness.

Preferably, the internal diameter of the rubber type insert is equal to the external diameter of the said cylinder and the said rubber type insert makes a substantial contact of a portion of the circumference of the aforesaid cylinder.

Preferably, the rubber type insert adhered to each of the said frames having an inner surface which, in use, faces the cylinder and the said rubber type insert being isometric on both halves of the hinged frame.

Preferably, the rubber type insert is abraded on the surface that makes contact with the said cylinder.

Preferably, the rubber type insert, in use, makes sole contact with the aforesaid cylinder.

Preferably, each of said half round or oval frames possesses one male and one female hinge component.

Preferably, the said male and the said female hinge components each comprise of square shoulders and square lugs on the underside and rounded lugs to the top.

Preferably, each of said frames has a bend forming an acute angle on the underside of 7 degrees.

Preferably, the device has an oblique bend between each of said frames and said corresponding fixed lifting members.

Preferably, each of said half round or oval frames, has at least one portion, proximal to the hinges, that is not lined with said rubber type insert and where the said at least one frame portion is substantially thinner than a remaining frame portion that is lined with the said rubber type insert.

All of the features disclosed herein may be combined with any of the above aspects and in any combination.

A specific embodiment of the invention will now be described by way of example with reference to the accompanying drawings, in which:

FIG. 1 is a schematic view of a compressed gas storage cylinder standing in a vertical position, a lifting device is situated above the compressed gas storage cylinder in an open position.

FIG. 2 is a schematic view of the lifting device, in an open position, lowered around the compressed gas storage cylinder.

FIG. 3 is a schematic view of the compressed gas storage cylinder elevated and encompassed by the lifting device in a closed configuration.

FIG. 6 is a plan view of the lifting device in an open position.

FIG. 7 is a side view of the lifting device in the open position.

FIG. 8 is a plan view of the lifting device in the closed/lifting position.

FIG. 9 is a side view of the lifting device in the closed/lifting position.

Figure 4:
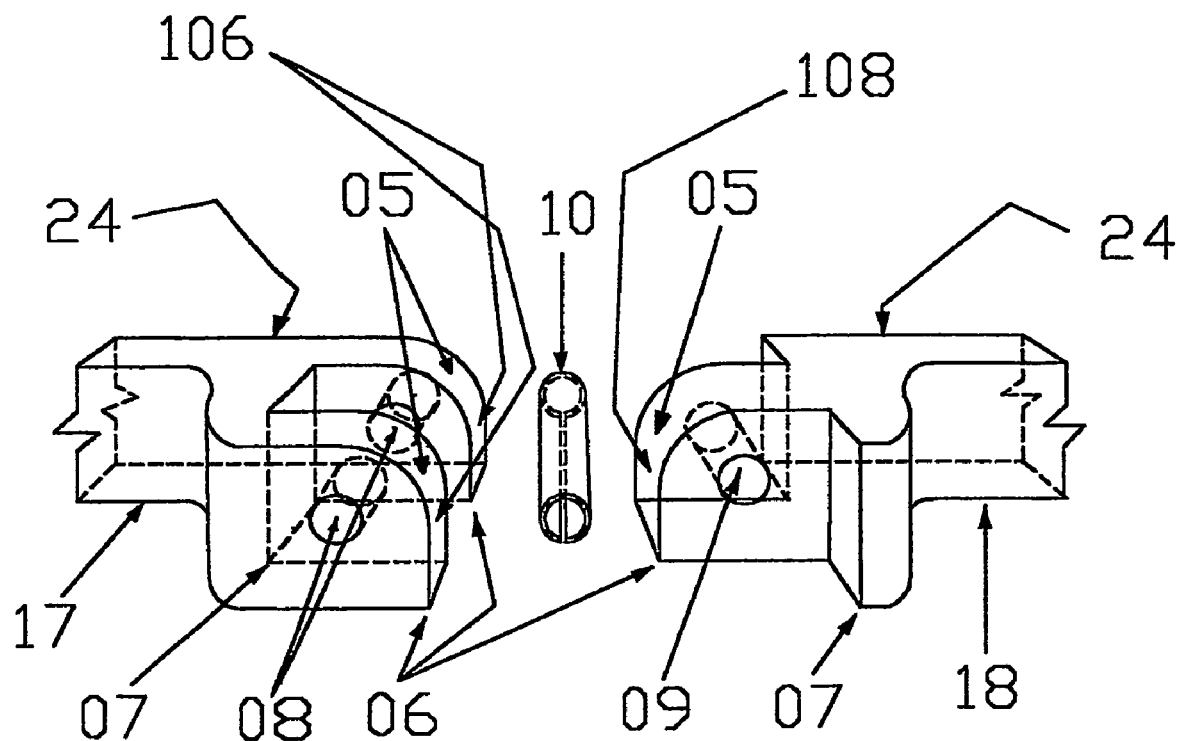
FIG. 4 is an exploded view of a hinge between two frame members of a lifting device, in detail.

As shown in FIG. 1 a compressed gas storage cylinder 01 stands vertically on a ground surface 04. The lifting device 102 is in an open position 02 and situated above the compressed gas storage cylinder 01 prior to a lifting sequence.

As shown in FIG. 2 the Lifting device 102, in the open position 02, is lowered over the cylinder 01 to a required handling height.

As shown in FIG. 3 a lifting member 16 (a handle) in opposite relationship attached to each half of the said lifting device 102 is lifted upwards and inwards resulting in the said lifting device closing into a gripping position 03, against and encompassing the said cylinder 01.

The lifting members 16 are handles which are diametrically opposed about the lifting device.

A detailed view of a hinge mechanism can be seen in FIG. 4. The lifting device 102 being constructed from two substantially identical halves 104, with a female hinge connection 17 and a male hinge connection 18 at opposing ends of each half. The female hinge connection 17 has two protruding parallel arms 106 having coaxial apertures through each arm 106 through which a pin 10 is threaded. The male hinge connection 18 has a single protruding arm 108 of a width to fit between the two parallel protruding arms 106 of the female hinge connection 17. The arm 108 has an aperture therethrough through which a pin 10 is placed. When in the open position 02 a square hinge lug 06 rests against a square corner 07 preventing further radial movement. The square hinge lug 06 is formed at a lower corner of the arms 106, 108. A rounded hinge lug 05 allows the lifting device 102 to hinge upwards into the closed/lifting position 03, as also seen is a hinge pin 10 about which the halves 104 may pivot. The rounded hinge lug 05 is formed at an upper corner of the arms 106, 108. A hinge pin hole 08 in the said female hinge connection 17 is of true alignment, that is to say, coaxial, with a second hinge pin hole 8 matching in both hinge lugs and a true fit for the said hinge pin 10, whereas there is clearance in a hinge pin hole 09 from the hinge pin 10 in the said male hinge connection 18 allowing ease of movement. By the hinge pin 10 having a true fit within the coaxial pin holes 8, it is meant that the hinge pin 10 has a friction fit within the pin holes 8.

To construct the lifting device 102, the two halves 104 of the device are slotted together such that the arm 108 of the male hinge connection 18 sits inside the arms 106 female hinge connection 17 such that the hinge pin holes 8,9 are aligned and a hinge pin 10 then slotted therethrough and secured by virtue of the friction fit within the hinge pin holes 8.

Therefore, as is shown in FIGS. 1 and 2, when no upward pressure is applied to the halves 104, they pivot under their own weight into an open position but are prevented from further pivotal movement by virtue of the square hinge lug 06 abutting the square corner 07.

Figure 5:
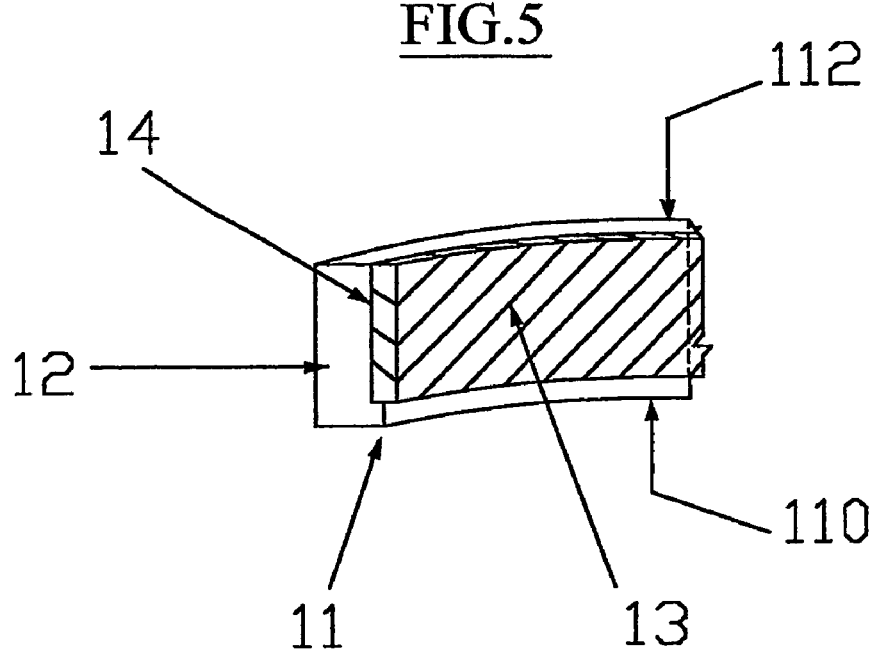
FIG. 5 is a sectional view through a frame member of the lifting device displaying a rubber type insert housed upon a shoulder.

A section through one half 104 of the lifting device 102 at point 12 can be seen in FIG. 5. This view shows the position of a rubber type insert 13 adhered to a frame surface 14. The frame half 104 has an underside 110 and a top 112. By underside in this context, it is meant a lower portion of the inner face. By top in this context it is meant an upper portion of the inner face. The rubber type insert 13 is retained by means of a shoulder 11 on the underside 110. The said rubber type insert 13 has an abraded surface making sole contact with said cylinder 01. The said shoulder 11 is located on the underside of the frame half 104. The shoulder 11 runs the full length of the rubber type insert 13 terminating at points 19 and 20 as can be seen in FIGS. 6, 7, 8 and 9. The said rubber type insert 13 being of a thickness which is substantially twice that of the aforementioned shoulder 11, as can also be seen in FIG. 9, thus preventing contact between the lifting device frame and said cylinder 01.

FIG. 6 shows a plan view of the Lifting device in the open position. Here are shown the substantially identical (except for the hinge parts) halves of the lifting device 102, with the female hinge connections 17 and the male hinge connections 18. The aforesaid rubber type inserts 13 are isometric and can also be seen in situ on both halves. The hinges are set wider than a true centre of the rubber type insert's abraded surface, resulting in an additional width between points 22 and 23 providing a cylinder clearance 25 required in the open position. The cylinder clearance 25 is required so that the device 102 may be slipped over a cylinder 01, when the device 102 is in the open position 02. Cylinder clearance 25 means that an aperture formed by the two halves 104 of the device 102 is greater than the cross sectional area of the cylinder. In FIG. 6 the lifting device frame can be seen as an oval construction producing a moon-crescent shape clearance from the cylinder. By this it is meant that the cylinder 01, being circular in cross section fits inside the oval aperture formed by the frame halves 104 when the device 102 is in the open position 02 such that the diametric distance of the oval shaped aperture at its narrowest point is only slightly larger than the diametric distance of the circular cross section of the cylinder 01, but the diametric distance of the oval shaped aperture at its largest point is somewhat larger than the diametric distance of the circular cross section of the cylinder 01. Thus, when the device 102 is situated about the cylinder 01 in an open position 02, when viewed from above (not shown) there are two, equal and opposite, crescent shaped gaps between the cylinder 01 and the oval shaped aperture. At points 24 on FIGS. 6 and 8, the lifting device frame has a reduction in thickness internally between points 19 and 20 this provides clearance between the lifting device frame and the cylinder 01.

A fixed lifting member 16 (handle) can be seen welded to the frame halves 104 at points 15. It will be appreciated by one skilled in the art that other attachment methods to fix the handle 16 to the frame halves 104 may be employed. The hinge pins 10 can be seen at point 10.

FIG. 7 shows a side view of the lifting device in the open position 02. The frame half 104 having an oblique angle bend of substantially 7 degrees can be seen in this view. The clearance 25 from the cylinder 01 is shown at the shoulder 11.

FIG. 8 shows a plan view of a lifting device in the lifting or closed position 03. The rubber type insert 13, having an internal diameter equal to that of an external diameter of the cylinder 01, can be seen encompassing and making a precise contact with a portion of the circumference of the said cylinder 01. The said rubber type insert 13 being abraded on the internal diameter surface. In the closed position 03 the frame halves 104 form an aperture which is substantially circular in plan view as is shown in FIG. 8. The rubber type insert 13 is abraded to increase the friction between the device 102 and the cylinder 01 to reduce the likelihood of the cylinder slipping through the device 102 when lifted.

FIG. 9 shows a side view of the lifting device 102 in the closed/lifting position 03. The oblique bent points 19, 20 can be seen presenting the rubber type insert 13 true to the cylinder 01. In this context, the word true means substantially parallel with the side walls of the cylinder 01. The bent points 21 ensure that the fixed lifting member 16 (the handle) forms an oblique angle to the cylinder 01, when the device is in the closed position 03. The square hinge lug 06 and the rounded hinge lug 05 are also shown.

A lifting device made in accordance with the present invention provides an easy to use aid to lifting an article which otherwise would be difficult to handle and lift. Further, the provision of a gripping surface which is adapted to lie substantially parallel with the side walls of an article to be lifted when in the second, closed, configuration allows a high surface area contact between the device and the article to be lifted thereby decreasing the likelihood of the article slipping while being lifted and thereby preventing injury to a user.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A compressed gas storage cylinder lifting device comprising handle means, a first frame member, and a second frame member pivotably connected to the first frame member, the first and second frame members adapted to pivot between a first, open, configuration and a second, closed, configuration, wherein at least a portion of inner walls of the first and second frame members form a gripping surface, which gripping surface is adapted to lie substantially parallel with side walls of the compressed gas storage cylinder when in the second, closed, configuration; wherein the handle means slope downward with respect to the compressed gas storage cylinder when in the second, closed configuration, wherein the first and second frame members are shaped such that when in the second, closed, configuration they define a substantially circular shaped aperture, wherein when the lifting device is positioned upright and no upward pressure is applied to the frame members, the first and second frame members pivot under their own weight into the first, open, configuration, but are prevented from further pivotal movement by a first abutment member located on the first frame member abutting a second abutment member located on the second frame member and wherein the frame members each comprise a first portion, proximal to the pivots, which first portions, when in the first, open, configuration, extend away from the pivots at substantially 180° to each other.

2. A compressed gas storage cylinder lifting device as claimed in claim 1, wherein the first and second frame members are pivotably connected at two points.

3. A compressed gas storage cylinder lifting device as claimed in claim 2, wherein the two pivot points are substantially coaxial.

4. A compressed gas storage cylinder lifting device as claimed in claim 1, wherein the first and second frame members are shaped such that they define a substantially oval shaped aperture when in the first, open, configuration.

5. A compressed gas storage cylinder lifting device as claimed in claim 1, wherein the handle means comprises two handles each of which is attached to one of the first and second frame members and situated substantially opposite each other about the device.

6. A compressed gas storage cylinder lifting device as claimed in claim 1, wherein the gripping surface defines a portion of an oval when in the first, open, configuration.

7. A compressed gas storage cylinder lifting device as claimed in claim 1, wherein the gripping surface defines a portion of a circle when in a second, closed configuration.

8. A compressed gas storage cylinder lifting device as claimed in claim 1, wherein the gripping surface comprises gripping means.

9. A compressed gas storage cylinder lifting device as claimed in claim 8, wherein the gripping means comprises a friction increasing material.

10. A compressed gas storage cylinder lifting device as claimed in claim 8, wherein the gripping means comprises rubber or the like.

11. A compressed gas storage cylinder lifting device as claimed in claim 1, wherein the gripping surface comprises retaining means adapted to retain the gripping means thereon.

12. A compressed gas storage cylinder lifting device as claimed in claim 11, wherein the retaining means comprise a lip which extends along a lower edge of the gripping surface.

13. A compressed gas storage cylinder lifting device as claimed in claim 1, wherein when in the first, open, configuration the first portions of the first and second frame members are substantially coplanar.

14. A compressed gas storage cylinder lifting device as claimed in claim 1, wherein a second portion of each frame member extends away from an end of the first portion of each frame member distal to the pivots.

15. A compressed gas storage cylinder lifting device as claimed in claim 14, wherein when in the second, closed, configuration, the second portions of the first and second frame members are substantially coplanar.

16. A compressed gas storage cylinder lifting device as claimed in claim 14, wherein the second portion incorporates the gripping surface.

17. A compressed gas storage cylinder lifting device as claimed in claim 14, wherein the second portion extends away from the first portion at a downwardly sloping angle thereto.

18. A compressed gas storage cylinder lifting device as claimed in claim 14, wherein the handle means extend away from the second portion of the first and second frame members at a downwardly sloping angle thereto.

19. A compressed gas storage cylinder lifting device comprising handle means and at least a first frame member and a second frame member being connected by at least one pivot and adapted to pivot between a first, open, configuration and a second, closed, configuration, the first and second frame members each comprising a first portion, proximal to the at least one pivot, and a second portion extending away from an end of the first portion distal to the at least one pivot, which first portions, when in the first, open, configuration are substantially coplanar and which second portions, when in the second, closed, configuration are substantially coplanar; wherein the handle means slope downward with respect to the compressed gas storage cylinder when in the second, closed configuration, wherein the first and second frame members are shaped such that when in the second, closed, configuration they define a substantially circular shaped aperture, wherein when the lifting device is positioned upright and no upward pressure is applied to the frame members, the first and second frame members pivot under their own weight into the first, open, configuration, but are prevented from further pivotal movement by a first member situated on the first frame member abutting a second member on the second frame member.

* * * * *